Oct. 15, 1957  L. A. BARD ET AL  2,809,515
COOLANT TESTING INSTRUMENT
Filed Oct. 20, 1954
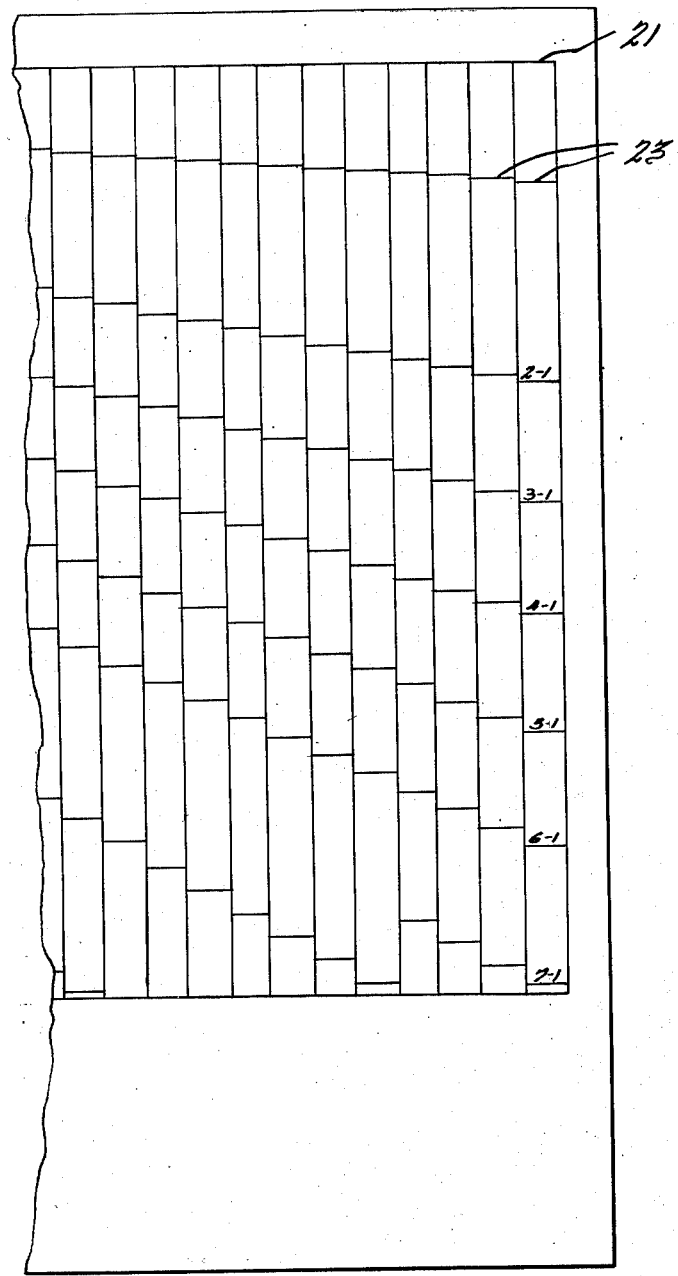
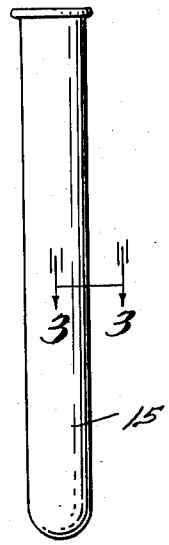
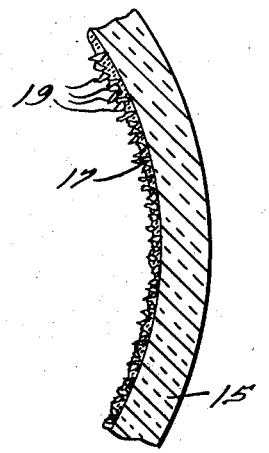
INVENTORS
Larry A. Bard
Donald E. Cardoze
Lennart M. Hellstrom
BY
Harness, Dickey & Pierce
ATTORNEYS

United States Patent Office 2,809,515
Patented Oct. 15, 1957

2,809,515

COOLANT TESTING INSTRUMENT

Larry A. Bard, Birmingham, Donald E. Cardoze, Roseville, and Lennart M. Hellstrom, Detroit, Mich., assignors to Michigan Tool Company, Detroit, Mich., a corporation of Delaware Application October 20, 1954, Serial No. 463,500

6 Claims. (Cl. 73—53)

This invention relates to a coolant testing instrument and more particularly to a disposable instrument for determining the dilution of coolants consisting of water soluble oils.

Diluted water soluble oils, or otherwise described, emulsions of water and water soluble oils, are commonly used as coolants in most metal cutting operations. The proper use of coolants is an important factor in the efficiency of almost any metal cutting operation. Coolants not only dissipate the heat produced in the cutting tool and the workpiece, but they also tend to increase the life of cutting tools, conserve on the power used in the cutting operation, give a good finish to the work, and assure more accurate dimensions.

Proper machine shop practice requires close quality control of coolants. Depending upon such factors as the type of cutting operation and the type of metal being cut, the correct degree of dilution of a water soluble oil will vary. Some jobs require a much higher percentage of oil than others. In broaching, for instance, the dilution of a water soluble oil coolant is usually extremely critical to obtaining good results. Accordingly during a metal cutting operation the oil is frequently tested in order to insure that it is of the correct dilution. Under present practice, a sample of the oil is taken to a laboratory where a trained technician performs the analysis. This procedure generally requires a minimum of 30 minutes. In view of the long time involved in obtaining an accurate analysis, a machine operator will occasionally add oil to the solution when he thinks that the dilution is too weak. This procedure, involving guesswork, often results in incorrect results and the wasting of costly oil by making the solution more concentrated than is necessary.

It is therefore an object of this invention to provide a means whereby the dilution of a water soluble oil may be easily and rapidly determined on the job by a machine tool operator without the necessity of an analysis by a trained chemist.

It is a further object of this invention to provide means for the rapid determination of a water soluble oil dilution whereby the efficiency of metal cutting operations may be increased and oil may be conserved.

A still further object of the present invention is to provide a testing instrument which is capable of rapidly and accurately indicating the dilution of water soluble oil cooling solutions and which is inexpensive of construction so that it may disposed of once it has been used.

Other objects and advantages of the invention will become apparent from the following specification, the drawings relating thereto, and from the claims hereinafter set forth.

Figure 1 is a portion of a chart with which the testing instrument of this invention is used;

Fig. 2 is an elevational view of a testing instrument embodying the principles of the present invention; and, Fig. 3 is an enlarged cross-sectional view of the structure shown in Fig. 2, taken along the lines 3—3 thereof.

Referring now to Figs. 2 and 3, the instrument includes an elongated tubular container 15, which is similar in shape to the ordinary glass test tube. The container 15 may be made of glass or plastic, its only requirement being that it be translucent or relatively transparent. Covering the inside surface of the container 15 is a thin layer of white wax 17. This wax may be the usual sealing wax, such as is used in home canning operations. The only limitations on the type of wax or wax-like material which may be successfully employed are that it must adhere to the container surface and be relatively translucent so that the soluble oil emulsion is visible through it. Impregnated in the inner layer of wax 17, so as to be exposed to the inner area of the container 15, is a layer of water soluble salt 19. The salt 19 is held in position by the adhesive qualities of the wax 17, but the granules of salt are not completely covered by the wax. A portion of the surface of the particles is exposed to the inner area of the container so that they are readily available for absorption by the coolant when it is poured into the container 15. To further aid the absorption of the salt, the salt is preferably distributed as uniformly as is possible over the wax.

A wide variety of salts 19 may be satisfactorily employed for coating the interior surface of the wax layer 17. The only restriction on the salt is that it should be a water soluble one. The preferred salts are the alkali metal halides, sulfates and nitrates, although alkaline earth metal or heavy metal halides, sulfates and nitrates may also be used. Unusually good results have been obtained using ammonium nitrate as the selected salt.

The container 15 is preferably shaped so as to be thin and tubular in order to present a relatively great amount of inner surface area in comparison to its volumetric capacity. By this means the salt is made readily available to the emulsion and will be more easily absorbed thereby. The amount of salt 19 in the layer 17 is preferably the maximum quantity that can be embedded in the wax layer. The presence of this quantity of water soluble salt insures a complete breakdown of the emulsion into its components.

The use of the testing instrument is relatively simple and may be easily executed by an untrained person. The container 15 is filled with the coolant to be tested. The tester's thumb is then held over the mouth of the container to prevent the escape of the coolant and while the mouth of the container is plugged the container is shaken vigorously for from ten to twenty seconds. At the end of five minutes of standing the water and oil will have separated from one another, the oil being disposed on top of the water. The proportion of oil to water in the solution may be readily determined by means of a chart such as that illustrated in Fig. 1. The instrument is held upright against the chart with the top of the oil level aligned with line 21 of the chart. The instrument is then moved along the chart so that the separation line between the oil and the water comes into alignment with one of the lines 23. The dilution is then found by reading the dilution indicated adjacent to the bottom of the tube, the dilution of, for example, 2–1 meaning 2 parts of water to 1 part of oil. By the use of such a chart it will be apparent that no particular amount of liquid need have been put in the container 15. The chart will give the proportions for any amount of liquid in a tube of a given diameter, and once the tube diameter is selected it will be understood that an appropriate chart may be easily prepared. Furthermore, the container 15, disposing the oil and water in a tall, thin column, makes the readings extremely accurate.

It will be readily apparent that this testing instrument is extremely inexpensive of fabrication. Therefore once a quantity of coolant has been tested in an instrument, that instrument may be feasibly discarded. This eliminates the need for cleaning the testing apparatus after use, and also eliminates the great loss involved should an expensive testing apparatus be broken during its use.

The layers of wax 17 and salt 19 may be formed on the inside of the tubular container 15 by a plurality of methods. A satisfactory procedure which has heretofore been utilized comprises the following steps: First, filling the tubular container with wax, the wax being in a fluid, molten condition; second, pouring out the excess wax which fails to adhere to the inner surface of the container; third, allowing the wax remaining in the tube to harden slightly to better retain the salt; fourth, inserting a quantity of salt into the container and then compressing the salt against the bottom and sides of the container by use of a plunger of slightly less diameter than the diameter of the container; fifth, repeating the fourth step a sufficient number of times to uniformly coat the entire inner surface of the container, each time using a quantity of salt which may be conveniently compacted; sixth, pouring out the excess salt which failed to adhere to the wax; and, seventh, allowing the wax to harden by cooling or by leaving the instrument in a place of normal room temperature.

On a production basis, the salt 19 may be imbedded in the wax 17 by the use of an inflatable rubber tube. A rubber tube of similar shape but slightly less in size than the inside of the container is partially inflated and inserted into the container, which already has a thin layer of wax on the inner surface thereof formed according to steps one, two, and three described above. A quantity of salt is then dropped into the container around the tube and the tube is inflated, pressing the salt into the wax. This procedure is repeated a sufficient number of times to coat the entire inner surface of the container with preferably the maximum amount of salt which will adhere to the wax layer.

While it will be apparent that the preferred embodiment herein disclosed is well calculated to fulfill the objects above stated, it will be appreciated that the invention is susceptible to modification and variation and change without departing from the proper scope or fair meaning of the subjoined claims.

What is claimed is:

1. A testing instrument comprising a container having a layer of wax covering the inner surface thereof, and a layer of water soluble salt uniformly imbedded in and distributed over said wax, so as to be exposed to the inner area of said container.

2. A testing instrument comprising a translucent container, a layer of wax disposed over the inner surface of said container, a layer of material imbedded in and uniformly distributed over the said layer of wax, said material being the halides, nitrates and sulfates of the alkali metals, said material being exposed to the inner area of said container.

3. A testing instrument comprising an elongated tubular container, a layer of wax disposed over the inner surface of said container, a layer of ammomium nitrate uniformly imbedded in and uniformly distributed over the said layer of wax so as to be exposed to the inner area of said container.

4. The method of making a testing instrument consisting of the steps of pouring molten wax into a container, draining the container of the wax which failed to adhere to the inner surface of the container, and after the wax has hardened slightly introducing a quantity of water soluble salt into the wax-lined container, inserting a plunger into said container and compacting said salt with said plunger against the bottom and sides of the wax lining of said container, introducing additional quantities of said salt into said container and repeating said compacting until substantially the entire inner surface of the wax lining is covered by a layer of salt.

5. The method of making a testing instrument comprising the steps of inserting a partially inflated rubber tube into a container of slightly greater inside diameter than the diameter of said tube, pouring molten wax into said container around said tube, deflating said tube and depositing a quantity of water soluble salt into said container around said tube, inflating said tube so as to cause said salt to be imbedded in said wax, and repeating the last named step until substantially the entire inner surface of said container is covered by a layer of salt.

6. The method for quickly determining the dilution of coolants which are emulsions of water and water soluble oil comprising covering the inner surface of a container with a layer of wax, imbedding in and uniformly distributing over said wax a layer of water soluble salt, introducing a quantity of coolant into said container and agitating said coolant so as to interact said coolant with said salt to cause the oil and water to separate, and placing said container before a calibrated background chart to directly determine the dilution.

References Cited in the file of this patent

UNITED STATES PATENTS

| | | |
|---|---|---|
| 270,489 | Schubert | Jan. 9, 1883 |
| 1,960,923 | Ricker | May 29, 1934 |
| 2,062,897 | Michel et al. | Dec. 1, 1936 |
| 2,269,134 | Tarnoski | Jan. 6, 1942 |

FOREIGN PATENTS

| | | |
|---|---|---|
| 352,029 | Germany | Apr. 20, 1922 |